W. B. QUICK.
Sulky-Plow.

No. 160,280.    Patented March 2, 1875.

WITNESSES:
Chas. F. Meisner
J. W. Herthel

INVENTOR:
William B. Quick
per Herthel & Co.
Attys

UNITED STATES PATENT OFFICE.

WILLIAM B. QUICK, OF ST. LOUIS, MISSOURI.

IMPROVEMENT IN SULKY-PLOWS.

Specification forming part of Letters Patent No. 160,280, dated March 2, 1875; application filed December 7, 1874.

*To all whom it may concern:*

Be it known that I, WILLIAM B. QUICK, of St. Louis, Missouri, have invented an Improved Sulky-Plow, of which the following is a specification:

The nature of my invention relates to sulky-plows, and the novelty thereof consists in the arrangement of the various parts with relation to each other, to operate in the manner now to be more fully described.

Figure 1:
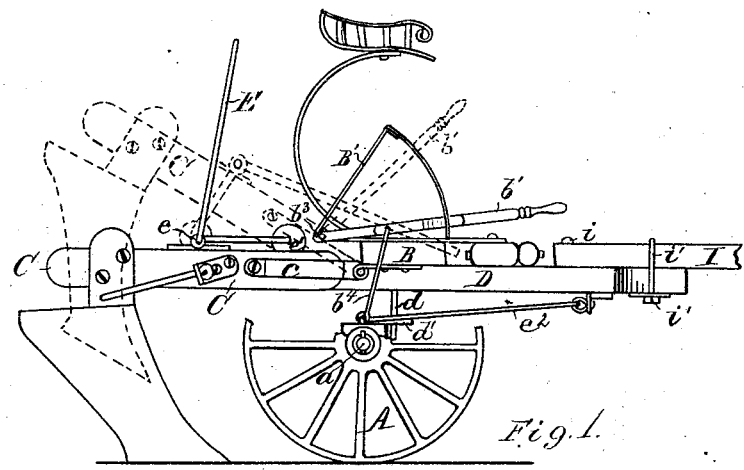
Figure 2:
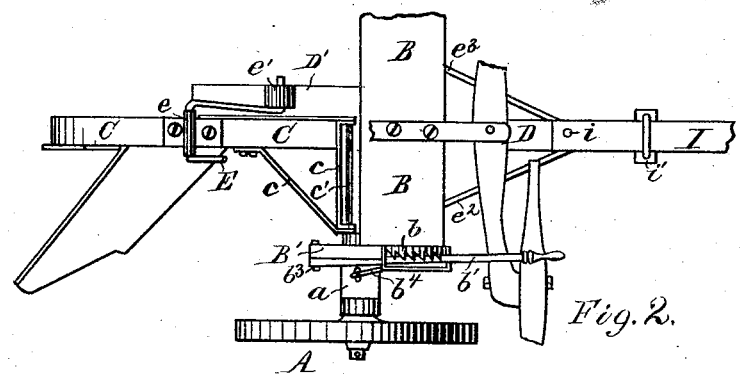
Figure 3:
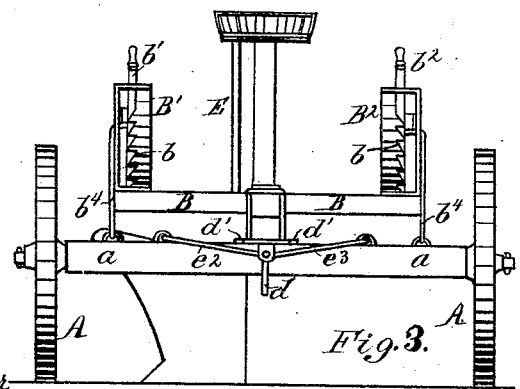

Of the drawing, Figure 1 is a side elevation. Fig. 2 is a top plan, and Fig. 3 is a front elevation.

A are the wheels; $a$, the axle. Upon the axle I support the plow-frame so as to be adjustable in the following manner: B is the plow-frame. Upon the frame B I secure the supporting-braces $B^1 B^2$. The segment part of these braces I provide with a series of ratchets, $b$. (See Figs. 2 and 3.) $b^1 b^2$ are hand-levers, which have their fulcrum at $b^3$, and otherwise are fitted to engage with the ratchets $b$ when operated for this purpose by the operator. The operation of the hand-levers being to raise or lower the plow-frame B, I further connect to each hand-lever one end of the pivotal bars $b^4$, the other ends of which are secured in eyebolts to the axle. By thus supporting the plow-frame B upon the axle, the same (as is apparent when the operator moves the hand-levers for this purpose) can be raised or lowered, and secured in adjusted position. By thus raising or lowering the plow-frame, I am enabled to gage the depth of the plow proper, as the nature of the case requires. I, therefore, attach the plow-beams to said adjustable plow-frame. C is the plow-beam, carrying the plow proper, as usual. The plow-beam I connect above the axle, so as to bring the plow-point as near the draft as possible, instead of the ordinary manner of connecting the plow-beam, and by which the plows are removed more distant from the axle, my object being to bring the plow or plows as close to the draft-horses as possible. For this purpose I secure to the plow-beam C an angle-brace, $c$. (See Fig. 2.) This is further to be hinged to the movable plow-frame B. To the under side of the movable frame B is bolted the draft-beam D. This is in line with the plow-beam C. Alongside of this draft-beam D is a sub-beam, D', parallel with the plow-beam C. (See Fig. 2.) One corner of the brace $c$ I secure to this sub-beam D', the other to an eyebolt on the under side of the movable frame B. A rod, $c'$, passes through these joints, connecting the parts so as to have a hinge movement, and as shown in Figs. 1 and 2. Thus connected the adjustability imparted to the plow-frame B likewise extends to the plow-beam in the same manner, and thus I am enabled to raise or lower the plow-point, or gage the depth of the plow, as the nature of the soil requires. At the same time it will be noticed that as the plow-beam is hinged, it can adapt itself to the level soil without danger of varying its depth. By disconnecting the rod $c'$ the plow-beam can readily be disengaged. The vertical movement of the plow-frame B is guided properly by a projecting bolt, $d$, extending from the bottom of the draft-beam D, and operating through a slotted bar, $d'$, secured to the top of the axle. The plow may be completely raised out of the soil, or so as to be inoperative, by operating the hand-lever E, which extends within reach of the driver's seat, and has its fulcrum or bent part passing through a sleeve, $e$, which is bolted to the top of the plow-beam. (See Figs. 1 and 2.) The lever is bent also, as shown in Fig. 2, and has a roller, $e^1$, which engages the top of the sub-beam D'. The operator, depressing the lever E, causes the roller to press upon the top of the beam, and consequently raises the plow-beam sufficiently to lift the plow out of the furrow. To the axle I further connect the brace-rods $e^2 e^3$, that connect in front of the under side of the draft-beam D. The said rods brace these parts firmly together. In order to take more or less land, I simply move the tongue to one side or the other. For this purpose I pivot, at $i$, to the draft-beam the tongue I. (See Figs. 1 and 2.) A U-brace, $i'$, further connects the tongue to the forward end of the draft-beam, and by fastening the bolts of said U-brace the tongue is held in the required position.

My improved plow, thus constructed, possesses therefore the advantages of lightness in draft, ease in operation, and simplicity and cheapness in construction.

What I claim is—

1. The plow-beam C, arranged in relation with the axle $a$ as herein shown and described, and hinged by its brace $c$ to the frame B and sub-beam D′, in the manner and for the purpose set forth.

2. The combination of the adjustable frame B, its braces $B^1$ $B^2$, levers $b^1$ $b^2$, rods $b^4$, and axle $a$, as herein shown and described, to operate as and for the purpose set forth.

In testimony of said invention I have hereunto set my hand.

WILLIAM B. QUICK.

Witnesses:
WILLIAM W. HERTHEL,
CHAS. F. MEISNER.